(12) United States Patent
Pyun et al.

(10) Patent No.: US 12,151,675 B2
(45) Date of Patent: Nov. 26, 2024

(54) DRIVING CONTROLLER FOR DETERMINING A RISK LEVEL OF A VEHICLE AND CONTROL METHOD THEREOF

(71) Applicants: HYUNDAI MOTOR COMPANY, Seoul (KR); KIA CORPORATION, Seoul (KR)

(72) Inventors: Rosali Sun Pyun, Seongnam-si (KR); Jin Su Jeong, Suwon-si (KR); Eun Young Choi, Seoul (KR); Ki Seok Seong, Cheonan-si (KR); Min Sang Yu, Hwaseong-si (KR); Hyeong Jin Ham, Seongnam-si (KR); Dong Il Yang, Seoul (KR); Woo Jin Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 693 days.

(21) Appl. No.: 17/325,673

(22) Filed: May 20, 2021

(65) Prior Publication Data

US 2022/0097691 A1 Mar. 31, 2022

(30) Foreign Application Priority Data

Sep. 28, 2020 (KR) ........................ 10-2020-0126256

(51) Int. Cl.
*B60W 30/095* (2012.01)
*B60W 30/09* (2012.01)
*B60W 50/14* (2020.01)

(52) U.S. Cl.
CPC ........ *B60W 30/09* (2013.01); *B60W 30/0956* (2013.01); *B60W 50/14* (2013.01);
(Continued)

(58) Field of Classification Search
CPC .. B60W 30/09; B60W 30/0956; B60W 50/14; B60W 2554/4046; B60W 2555/60;
(Continued)

(56) References Cited

U.S. PATENT DOCUMENTS 9,841,767 B1 * 12/2017 Hayward ............... B60Q 5/006
10,223,842 B1    3/2019 Lee et al.
(Continued)

FOREIGN PATENT DOCUMENTS

CA      2976155 C  *  5/2021  ............. G08B 21/24
EP      3683623 B1 *  9/2021  ............. B60K 28/02
(Continued)

*Primary Examiner* — Daniel M. Robert
(74) *Attorney, Agent, or Firm* — Lempia Summerfield Katz LLC

(57) ABSTRACT

A driving controller for a vehicle includes a detector that obtains driving information of a preceding vehicle and information about the road and a controller that determines a risk level of the preceding vehicle based on the driving information of the preceding vehicle and determines whether to perform avoidance control depending on the risk level. When it is determined that a breakdown or risk occurs in the preceding vehicle, the driving controller provides corresponding logic capable of avoiding the preceding vehicle.

16 Claims, 4 Drawing Sheets

(52) U.S. Cl.
CPC . *B60W 2554/4046* (2020.02); *B60W 2555/60* (2020.02); *B60W 2756/10* (2020.02)

(58) Field of Classification Search
CPC ......... B60W 2756/10; B60W 2556/45; B60W 30/08; B60W 40/02; B60W 40/10; B60W 2050/143; B60Y 2300/08; B60Y 2400/90
See application file for complete search history.

(56) References Cited

U.S. PATENT DOCUMENTS

| | | | |
|---|---|---|---|
| 2016/0133131 A1* | 5/2016 | Grimm | G08G 1/0141 701/117 |
| 2017/0113689 A1* | 4/2017 | Gordon | B60W 30/0956 |
| 2017/0183007 A1* | 6/2017 | Oh | B60W 30/09 |
| 2018/0326991 A1* | 11/2018 | Wendt | G07C 5/0808 |
| 2019/0101924 A1* | 4/2019 | Styler | G06V 20/56 |
| 2019/0213429 A1* | 7/2019 | Sicconi | G06F 3/012 |
| 2020/0130688 A1* | 4/2020 | Kline | B60W 10/11 |
| 2020/0192360 A1* | 6/2020 | Zheng | B60W 60/0057 |
| 2020/0205006 A1* | 6/2020 | Denis | H04L 63/1425 |
| 2020/0207360 A1* | 7/2020 | Dougherty | H04W 4/46 |
| 2021/0174616 A1 | 6/2021 | Yu et al. | |
| 2021/0295687 A1* | 9/2021 | Salles | G08G 1/09675 |
| 2022/0097691 A1* | 3/2022 | Pyun | B60W 30/09 |
| 2022/0309848 A1* | 9/2022 | Hoshino | G07C 5/008 |
| 2022/0410914 A1* | 12/2022 | Na | G05B 23/0289 |

FOREIGN PATENT DOCUMENTS

| | | |
|---|---|---|
| KR | 10-2019-0048061 | 5/2019 |
| KR | 10-2021-0070477 | 6/2021 |

\* cited by examiner

DRIVING CONTROLLER FOR DETERMINING A RISK LEVEL OF A VEHICLE AND CONTROL METHOD THEREOF

CROSS-REFERENCE TO RELATED APPLICATION

This application claims priority to and the benefit of Korean Patent Application No. 10-2020-0126256, filed on Sep. 28, 2020, the entire contents of which are incorporated herein by reference.

FIELD

The present disclosure relates to a driving controller for a vehicle and a method thereof.

BACKGROUND

The statements in this section merely provide background information related to the present disclosure and may not constitute prior art.

In the society of automotive engineers (SAE), the autonomous driving levels are divided into Levels 0 to 5. In Level 3 autonomous driving among them, the entity of vehicle driving is a system rather than a person, and the system may simultaneously recognize vehicle control and driving environments to perform autonomous driving. Thus, it is important for an autonomous vehicle in Level 3 autonomous driving to accurately recognize driving environments. Particularly, it is important for the autonomous vehicle in Level 3 autonomous driving to determine whether a preceding vehicle breaks down or a risk level of the preceding vehicle for safe driving on the road. Furthermore, it is important to recognize and determine whether the preceding vehicle meets autonomous driving regulations and road traffic regulations and a driving state of the preceding vehicle and share data with a driving manufacturer and a service operator.

SUMMARY

An aspect of the present disclosure provides a driving controller for a vehicle to determine whether a preceding vehicle which is an autonomous vehicle breaks down or a risk level of the preceding vehicle to accurately recognize driving environments and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a driving controller for a vehicle may include a detector that obtains driving information of a preceding vehicle and information about the road and a controller that determines a risk level of the preceding vehicle based on the driving information of the preceding vehicle and determines whether to perform avoidance control depending on the risk level.

The controller may determine a state of the preceding vehicle depending on regulations and a behavior state, when the preceding vehicle is an autonomous vehicle, and may determine the risk level based on the state of the preceding vehicle.

The controller may select autonomous driving regulations and road traffic regulations included in the regulations and the state of the preceding vehicle, when the preceding vehicle is the autonomous vehicle, and may determine the state of the preceding vehicle.

The controller may transmit state information of the autonomous vehicle to a server, when the preceding vehicle is the autonomous vehicle and when the risk level is determined.

The controller may determine the state of the preceding vehicle depending on the road traffic regulations and the behavior state, when the preceding vehicle is not the autonomous vehicle, and may determine the risk level based on the state of the preceding vehicle.

The controller may output a warning to a driver and may guide the driver to select whether to perform the avoidance control, when the risk level of the preceding vehicle is a caution level.

The controller may control to perform the avoidance control, when the risk level of the preceding vehicle is a critical level.

The controller may determine the state of the preceding vehicle based on one of a time when the preceding vehicle makes a lane change, a turn signal direction, a turn signal operation time, an emergency steering function operation, or whether a minimum risk maneuver (MRM) operates, which is included in the autonomous driving regulations, when the preceding vehicle is the autonomous vehicle.

The controller may determine the state of the preceding vehicle based on one of whether the preceding vehicle disobeys a traffic light, whether the preceding vehicle makes a lane change on a solid line area, whether the preceding vehicle does not obey a specified driving direction on a lane, or whether the preceding vehicle operates brake lights upon deceleration, which is included in the road traffic regulations, when the preceding vehicle is the autonomous vehicle.

The controller may determine the state of the preceding vehicle based on one of whether the preceding vehicle departs from the lane, whether the preceding vehicle performs sudden deceleration or sudden acceleration greater than a certain range, whether the preceding vehicle does not operate a turn signal upon a lane change, or whether the preceding vehicle makes lane changes above the certain number of times within a certain time, which is included in the behavior state, when the preceding vehicle is the autonomous vehicle.

According to another aspect of the present disclosure, a driving control method for a vehicle may include obtaining driving information of a preceding vehicle, determining a risk level of the preceding vehicle based on the driving information of the preceding vehicle, and determining whether to perform avoidance control depending on the risk level.

The determining of the risk level of the preceding vehicle may include determining a state of the preceding vehicle depending on regulations and a behavior state, when the preceding vehicle is an autonomous vehicle, and determining the risk level based on the state of the preceding vehicle.

The driving control method may further include selecting autonomous driving regulations and road traffic regulations included in the regulations and the behavior state, when the preceding vehicle is the autonomous vehicle, and determining the state of the preceding vehicle.

The driving control method may further include transmitting state information of the autonomous vehicle to a server, when the preceding vehicle is the autonomous vehicle and when the risk level is determined.

The driving control method may further include determining the state of the preceding vehicle depending on the road traffic regulations and the behavior state, when the preceding vehicle is not the autonomous vehicle, and determining the risk level based on the state of the preceding vehicle.

The determining of whether to perform the avoidance control depending on the risk level may include outputting a warning to a driver and guiding the driver to select whether to perform the avoidance control, when the risk level of the preceding vehicle is a caution level.

The determining of whether to perform the avoidance control depending on the risk level may include performing the avoidance control, when the risk level of the preceding vehicle is a critical level.

The driving control method may further include determining the state of the preceding vehicle based on one of a time when the preceding vehicle makes a lane change, a turn signal direction, a turn signal operation time, an emergency steering function operation, or whether a minimum risk maneuver (MRM) operates, which is included in the autonomous driving regulations, when the preceding vehicle is the autonomous vehicle.

The driving control method may further include determining the state of the preceding vehicle based on one of whether the preceding vehicle disobeys a traffic light, whether the preceding vehicle makes a lane change on a solid line area, whether the preceding vehicle does not obey a specified driving direction on a lane, or whether the preceding vehicle operates brake lights upon deceleration, which is included in the road traffic regulations, when the preceding vehicle is the autonomous vehicle.

The driving control method may further include determining the state of the preceding vehicle based on one of whether the preceding vehicle departs from the lane, whether the preceding vehicle performs sudden deceleration or sudden acceleration greater than a certain range, whether the preceding vehicle does not operate a turn signal upon a lane change, or whether the preceding vehicle makes lane changes above the certain number of times within a certain time, which is included in the behavior state, when the preceding vehicle is the autonomous vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
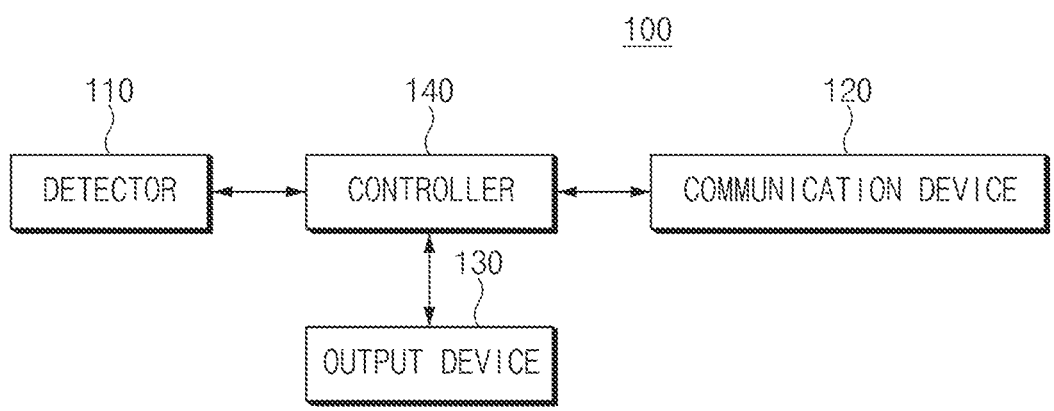
FIG. 1 is a block diagram illustrating a configuration of a driving controller for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the components of the forms according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a driving controller for a vehicle according to an exemplary form of the present disclosure.

As shown in FIG. 1, a driving controller 100 for a vehicle may include a detector 110, a communication device 120, an output device 130, and a controller 140. The driving controller 100 for the vehicle may be provided in an autonomous vehicle.

The detector 110 may detect information around the vehicle, for example, a preceding vehicle. the detector 110 may detect driving information of a preceding vehicle which is traveling in front of the vehicle (e.g., a host vehicle). As an example, the detector 110 may include a sensor and a camera.

The sensor may sense a preceding vehicle or a lane. The sensor may sense a signal reflected from a lane making of the road or the road ground to obtain ground information of the road or line information. According to one form, the sensor may include a radar or a light detection and ranging (LiDAR). Furthermore, the camera may obtain an image in front of the vehicle.

The communication device 120 may include a communication module capable of communicating with vehicle controllers over a vehicle network, and the communication module may include a module for supporting controller area network (CAN) communication. The communication device 120 may transmit information, obtained from the detector 110, to the controller 140 and may transmit the result calculated from the controller 140 to the output device 130. The communication device 120 may perform wireless communication with a server and may transmit information obtained by the detector 110 to the server. The communication device 120 may perform communication (vehicle-to-vehicle (V2V) and vehicle-to-everything (V2X)) with a surrounding vehicle and a surrounding infrastructure and may transmit information about a surrounding road situation such as traffic light information to the controller 140.

The output device 130 may output the result of the controller 140 as an image or a sound. To this end, the output device 130 may be implemented as a display or a speaker.

The controller 140 may be implemented by various processing devices, such as a microprocessor, embedding a semiconductor or the like capable of calculating or executing various commands, and may control an operation of the driving controller 100 for the vehicle according to one form of the present disclosure. In detail, the controller 140 may determine a risk level of a preceding vehicle based on driving information of the preceding vehicle and may determine whether to perform an avoidance control depending on the risk level.

First of all, the controller 140 may detect the preceding vehicle around the vehicle. The controller 140 may determine whether the detected preceding vehicle is an autonomous vehicle. According to one form of the present disclosure, the controller 140 may determine whether the preceding vehicle is the autonomous vehicle based on a certain indication indicating that the preceding vehicle is the autonomous vehicle and may determine whether the preceding vehicle is the autonomous vehicle based on communication with the preceding vehicle.

When it is determined that the preceding vehicle is the autonomous vehicle, the controller 140 may determine the risk level of the preceding vehicle based on autonomous driving regulations the autonomous vehicle should obey, road traffic regulations, and a behavior state of the preceding vehicle.

To this end, in one form of the present disclosure, the controller 140 may determine whether the preceding vehicle meets autonomous driving regulations which should be obeyed upon a lane change among the autonomous driving regulations the autonomous vehicle should obey.

According to another form, the controller 140 may determine whether the preceding vehicle completes a lane change control within a certain time in an autonomous driving state. As an example, the controller 140 may determine whether the preceding vehicle operates a turn signal, starts to cross a line within 5 seconds, and perfectly enters a lane to be changed within 5 seconds after crossing the line. When the preceding vehicle does not complete the lane change control within the certain time in the autonomous driving state, the controller 140 may determine a state of the preceding vehicle as a critical state. The controller 140 may determine a state of the preceding vehicle based on the above-mentioned autonomous driving regulations. The autonomous driving regulations are not limited to the above-mentioned form and may include autonomous driving regulations enacted later.

Furthermore, the controller 140 may determine whether the preceding vehicle continues operating a turn signal upon lane change control in the autonomous driving state and may determine whether the preceding vehicle normally operates in a direction where a lane change is performed. According to another form, when the preceding vehicle continues operating the turn signal upon the lane change control in the autonomous driving state and when the preceding vehicle normally operates in the direction where the lane change is performed, the controller 140 may determine that control of the turn signal is normally performed. When the control of the turn signal is not normally performed, the controller 140 may determine the state of the preceding vehicle as a caution state.

Furthermore, the controller 140 may determine whether a behavior of the preceding vehicle is performed only in the lane when emergency steering is performed, may determine whether hazard lights are automatically turned on/off when the preceding vehicle stops after the emergency steering is performed, and may determine whether the hazard lights are automatically turned off when the preceding vehicle travels. According to one form, when the behavior of the preceding vehicle is performed only in the lane when the preceding vehicle performs the emergency steering in the autonomous driving state, and when the hazard lights are automatically turned on/off when the preceding vehicle stops after the emergency steering is performed, and when the hazard lights are automatically turned off when the preceding vehicle travels, the controller 140 may determine that the emergency steering is normally controlled. When the emergency steering is not normally controlled, the controller 140 may determine the state of the preceding vehicle as a caution state.

Furthermore, the controller 140 may determine whether to perform a minimum risk maneuver (MRM) at deceleration of a certain speed (e.g., 4 m/s2) or less. Herein, the MRM may include control of turning on/off the hazard lights, decelerating and stopping on the lane or making a lane change to a shoulder to stop on the shoulder. When the MRM is not normally performed at the deceleration of the certain speed or less, the controller 140 may determine the state of the preceding vehicle as the critical state.

When the preceding vehicle is the autonomous vehicle, the controller 140 may determine whether the preceding vehicle meets road traffic regulations. According to one form, the controller 140 may determine whether the preceding vehicle disobeys a traffic light according to the traffic laws, whether the preceding vehicle performs a lane change on a solid line area, whether the preceding vehicle does not obey in a predetermined driving direction on the lane, or whether the preceding vehicle operates brake lights upon deceleration. When the preceding vehicle disobeys a traffic light, the controller 140 may determine the state of the preceding vehicle as the critical state. When the preceding vehicle makes a lane change on the solid line area, the controller 140 may determine the state of the preceding vehicle as the caution state. When the preceding vehicle does not obey the predetermined driving direction on the lane, the controller 140 may determine the state of the preceding vehicle as the caution state. When the preceding vehicle does not operate the brake lights upon deceleration, the controller 140 may determine the state of the preceding vehicle as the caution state.

When the preceding vehicle is the autonomous vehicle, the controller 140 may determine a behavior state of the preceding vehicle. According to another form, the controller 140 may determine whether the preceding vehicle departs from the lane, whether the preceding vehicle performs sudden deceleration or sudden acceleration greater than a certain range, whether the preceding vehicle does not operate a turn signal upon a lane change, or whether the preceding vehicle makes lane changes above a certain number of times within a certain time. When the preceding vehicle departs from the lane, the controller 140 may determine the state of the preceding vehicle as the caution state. When the preceding vehicle performs the sudden deceleration or the sudden acceleration greater than the certain range, the controller 140 may determine the state of the preceding vehicle as the critical state. When the preceding vehicle does not operate the turn signal upon the lane change, the controller 140 may determine the state of the preceding vehicle as the caution state. When the preceding vehicle makes the lane changes above the certain number of times within the certain time, the controller 140 may determine the state of the preceding vehicle as the caution state.

When the preceding vehicle is the autonomous vehicle, when the preceding vehicle obeys all of autonomous driving regulations and road traffic regulations, and when the behavior state of the preceding vehicle is in a normal state rather than the caution state and the critical state, the controller 140 may determine the risk level of the preceding vehicle as a normal level. Furthermore, when it is determined that one of items of the autonomous driving regulations, the road traffic regulations, or the behavior state of the preceding vehicle is in the critical state, the controller 140 may determine the risk level of the preceding vehicle as a critical level. Furthermore, when it is determined that two of the items of the autonomous driving regulations, the road traffic regulations, or the behavior state of the preceding vehicle are in the critical state, the controller 140 may determine the risk level of the preceding vehicle as a caution level.

When it is determined that the preceding vehicle is not the autonomous vehicle, the controller 140 may determine a risk level of the preceding vehicle based on road traffic regulations the non-autonomous vehicle should obey and a behavior state of the preceding vehicle.

To this end, when the preceding vehicle is not the autonomous vehicle, the controller 140 may determine whether the preceding vehicle meets the road traffic regulations. According to one form, the controller 140 may determine whether the preceding vehicle disobeys a traffic light according to the traffic laws, whether the preceding vehicle makes a lane change on a solid line area, whether the preceding vehicle does not obey in a predetermined driving direction on the lane, or whether the preceding vehicle operates brake lights upon deceleration. When the preceding vehicle disobeys the traffic light, the controller 140 may determine the state of the preceding vehicle as the critical state. When the preceding vehicle makes the lane change on the solid line area, the controller 140 may determine the state of the preceding vehicle as the caution state. When the preceding vehicle does not obey the predetermined driving direction on the lane, the controller 140 may determine the state of the preceding vehicle as the caution state. When the preceding vehicle does not operate the brake lights upon deceleration, the controller 140 may determine the state of the preceding vehicle as the caution state.

Furthermore, when the preceding vehicle is not the autonomous vehicle, the controller 140 may determine a behavior of the preceding vehicle. According to another form, the controller 140 may determine whether the preceding vehicle departs from the lane, whether the preceding vehicle performs sudden deceleration or sudden acceleration, which is greater than a certain range, whether the preceding vehicle does not operate a turn signal upon a lane change, or whether the preceding vehicle makes lane changes above the certain number of times within a certain time. When the preceding vehicle departs from the lane, the controller 140 may determine the state of the preceding vehicle as the caution state. When the preceding vehicle performs sudden deceleration or sudden acceleration, which is greater than the certain range, the controller 140 may determine the state of the preceding vehicle as the critical state. When the preceding vehicle does not operate the turn signal upon the lane change, the controller 140 may determine the state of the preceding vehicle as the caution state. When the preceding vehicle makes the lane changes above the certain number of times within the certain time, the controller 140 may determine the state of the preceding vehicle as the caution state.

When the preceding vehicle is not the autonomous vehicle, when the preceding vehicle obeys all of road traffic regulations, and when the behavior state of the preceding vehicle is the normal state rather than the caution state and the critical state, the controller 140 may determine the risk level of the preceding vehicle as a normal level. Furthermore, when it is determined that one of items such as the road traffic regulations and the behavior state of the preceding vehicle is in the critical state, the controller 140 may determine the risk level of the preceding vehicle as a critical level. Furthermore, when it is determined that two of the items such as the road traffic regulations and the behavior state of the preceding vehicle are in the caution state, the controller 140 may determine the risk level of the preceding vehicle as a caution level.

When the preceding vehicle is not in the normal level, when it is determined that the preceding vehicle is an autonomous driving, and when it is possible for the preceding vehicle to directly communicate with a preceding vehicle manufacturer server or an autonomous driving service operation server of the preceding vehicle, the controller 140 may transmit state information of the preceding vehicle to the preceding vehicle manufacturer server or the autonomous driving service operation server of the preceding vehicle. When it is impossible for the preceding vehicle to directly communicate with the preceding vehicle manufacturer server or the autonomous driving service operation server, the controller 140 may first transmit state information of the preceding vehicle to a host vehicle manufacturer server or an autonomous driving service operation server of a host vehicle and may then transmit the state information of the preceding vehicle to the preceding vehicle manufacturer server or the autonomous driving service operation server of the preceding vehicle.

When it is impossible for the preceding vehicle itself to determine and transmit its state, the controller 140 may transmit the state information of the preceding vehicle to a server to transmit information (abnormal driving information) the autonomous vehicle should report to the Ministry of Transportation, thus easily managing the autonomous vehicle.

The controller 140 may perform whether to perform avoidance control depending to the risk level of the preceding vehicle. According to another form, when it is determined that the risk level of the preceding vehicle is the caution state, the controller 140 may output a warning to a driver and may provide the driver with the right to select whether to operate avoidance logic. As an example, the controller 140 may output the warning message 'You need to be careful about the driving of the preceding vehicle.' and may output the guidance message 'Shall we execute the avoidance control?' after the warning message is output.

Meanwhile, when the risk level of the preceding vehicle is the critical level, the controller 140 may perform control logic for avoiding the preceding vehicle. In other words, when the risk level of the preceding vehicle is the critical level, the controller 140 may fail to guide the driver of the host vehicle to select whether to perform the avoidance logic such that the host vehicle itself operates the avoidance logic.

According to one form of the present disclosure, the controller 140 may include a control logic for resetting a route using the avoidance logic for the preceding vehicle, controlling to avoid the preceding vehicle within the lane, or changing a target inter-vehicle distance.

When it is determined that the risk level is the caution level, the controller 140 may output a warning and may determine whether the operation of the control logic for avoiding the preceding vehicle is selected by the driver. When it is determined that the operation of the control logic for avoiding the preceding vehicle is not selected, the controller 140 may fail to perform the avoidance logic for the preceding vehicle and may output the guidance message that existing driving control is maintained. Meanwhile, when it is determined that the operation of the control logic for avoiding the preceding vehicle is selected by the driver, the controller 140 may perform the avoidance logic for the preceding vehicle.

Figure 2:
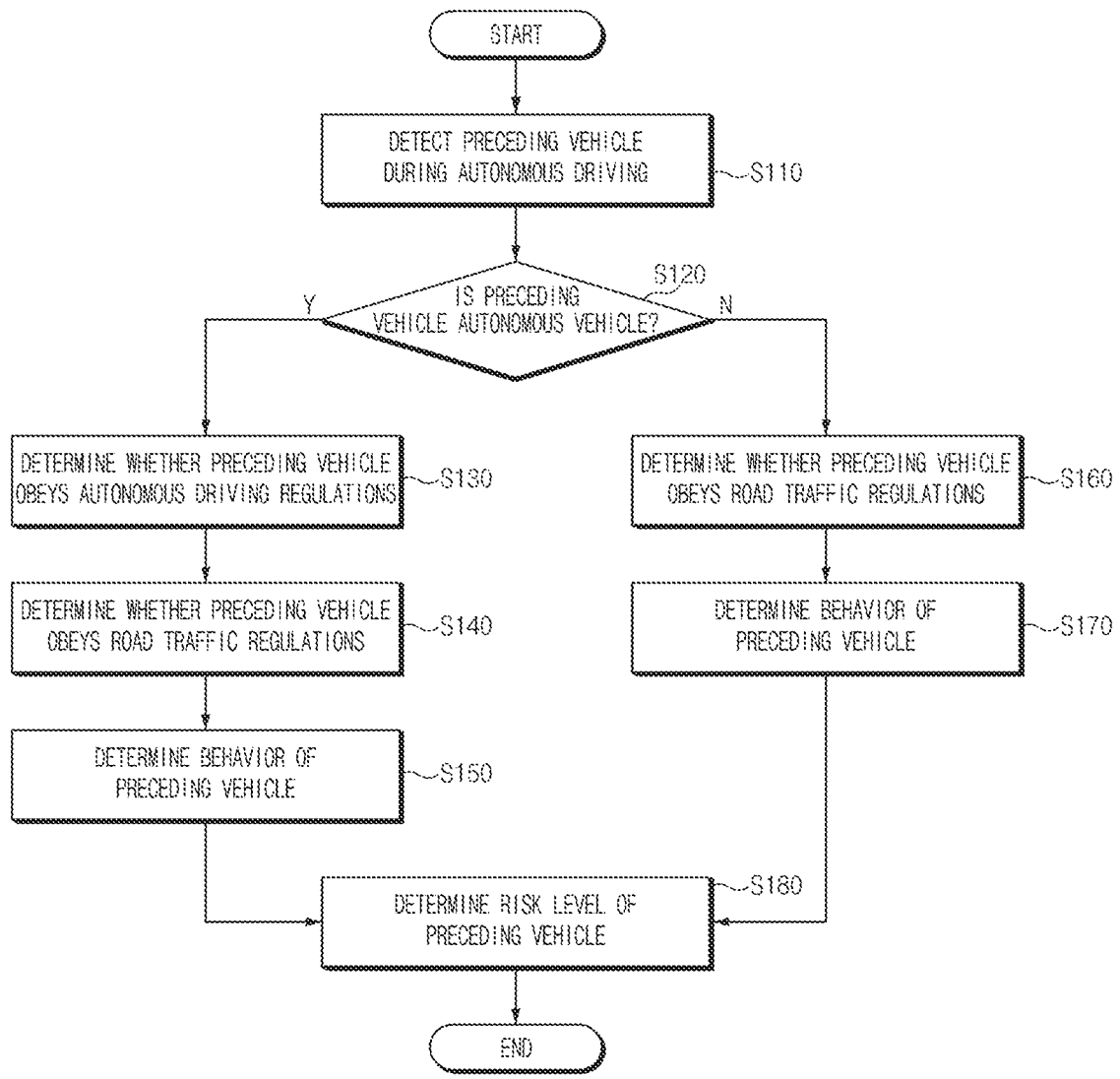
FIG. 2 is a flowchart illustrating a driving control method for a vehicle according to one form of the present disclosure.

FIG. 2 is a flowchart illustrating a method for determining a breakdown and a risk level of a preceding vehicle according to an exemplary form of the present disclosure.

As shown in FIG. 2, in S110, a controller 140 of FIG. 1 may detect a preceding vehicle around a vehicle. In S120, the controller 140 may determine whether the detected preceding vehicle is an autonomous vehicle. According to one form of the present disclosure, the controller 140 may determine whether the preceding vehicle is the autonomous vehicle based on a certain indication indicating that the preceding vehicle is the autonomous vehicle and may determine whether the preceding vehicle is the autonomous vehicle based on communication with the preceding vehicle.

When it is determined that the preceding vehicle is the autonomous vehicle in step S120 (Y), the controller 140 may determine whether the preceding vehicle obeys the autonomous driving regulations the autonomous vehicle should obey in step S130. When the preceding vehicle does not obey the autonomous driving regulations in S130, the controller 140 may determine the state of the preceding vehicle as a critical state or a caution state depending on a type of the autonomous driving regulations.

When the preceding vehicle is the autonomous vehicle, the controller 140 may determine whether the preceding vehicle obeys road traffic regulations in step S140. When the preceding vehicle does not obey the road traffic regulations in S140, the controller 140 may determine the state of the preceding vehicle as the critical state or the caution state depending on a type of the road traffic regulations.

When the preceding vehicle is the autonomous vehicle, the controller 140 may determine a behavior state of the preceding vehicle in step S150. According to one form, in S150, the controller 140 may determine the state of the preceding vehicle as the critical state or the caution state based on the behavior state of the preceding vehicle.

In step S180, the controller 140 may determine a risk level of the preceding vehicle based on the state of the preceding vehicle, which is determined in steps S130 to S150. When the preceding vehicle obeys all the autonomous driving regulations and the road traffic regulations and when the behavior state of the preceding vehicle is the normal state rather than the caution state and the critical state, the controller 140 may determine the risk level as a normal level. Furthermore, when it is determined that one of items such as the autonomous driving regulations, the road traffic regulations, and the behavior state of the preceding vehicle is in the critical state, the controller 140 may determine the risk level of the preceding vehicle as a critical level. Furthermore, when it is determined that two of the items such as the autonomous driving regulations, the road traffic regulations, and the behavior state of the preceding vehicle are in the caution state, the controller 140 may determine the risk level of the preceding vehicle as a caution level.

Meanwhile, when the preceding vehicle is not the autonomous vehicle in S120 (N), the controller 140 may determine whether the preceding vehicle obeys the road traffic regulations in step S160. When the preceding vehicle does not obey the road traffic regulations in S160, the controller 140 may determine the state of the preceding vehicle as the critical state or the caution state depending on a type of the road traffic regulations.

Furthermore, when the preceding vehicle is not the autonomous vehicle, the controller 140 may determine a behavior state of the preceding vehicle in step S170. According to one form, in S170, the controller 140 may determine the state of the preceding vehicle as the critical state or the caution state based on the behavior state of the preceding vehicle.

In S180, the controller 140 may determine a risk level of the preceding vehicle based on the state of the preceding vehicle in steps S160 and S170. When the preceding vehicle is not the autonomous vehicle in step S180, and when the preceding vehicle obeys all the road traffic regulations and when the behavior state of the preceding vehicle is the normal state rather than the caution state and the critical state, the controller 140 may determine the risk level of the preceding vehicle as the normal level. Furthermore, when it is determined that one of items such as the road traffic regulations and the behavior state of the preceding vehicle is in the critical state, the controller 140 may determine the risk level of the preceding vehicle as the critical level. Furthermore, when it is determined that two of the items such as the road traffic regulations and the behavior state of the preceding vehicle are in the caution state, the controller 140 may determine the risk level of the preceding vehicle as the caution level.

Figure 3:
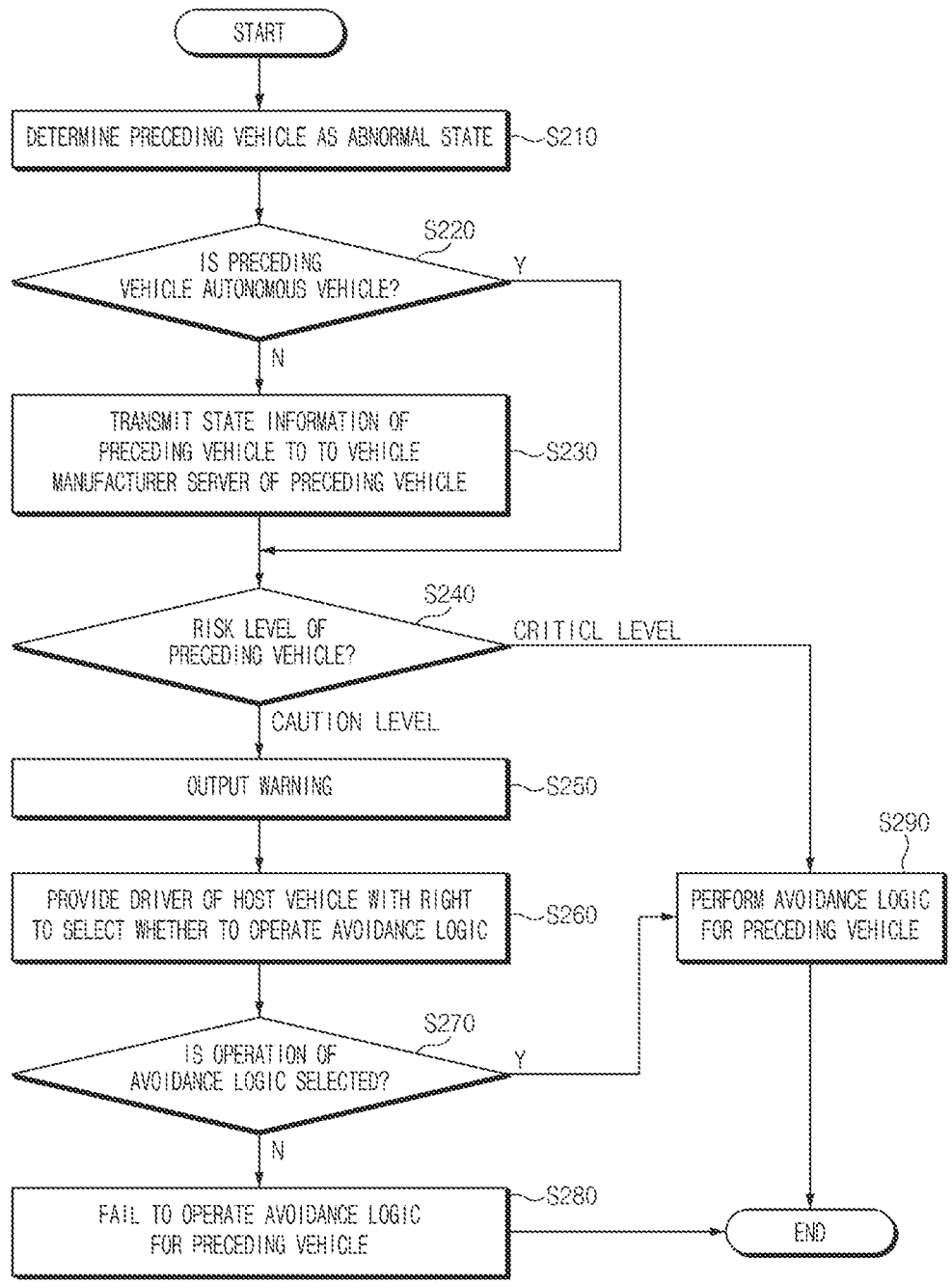
FIG. 3 is a flowchart illustrating a driving control method for a vehicle according to another form of the present disclosure.

FIG. 3 is a flowchart illustrating a method for determining a breakdown and a risk level of a preceding vehicle according to another form of the present disclosure.

When it is determined that the state of the preceding vehicle is not the normal state in step S210, the controller 140 may determine whether the preceding vehicle is an autonomous vehicle in step S220. When it is determined that the preceding vehicle is the autonomous vehicle in S220 (Y), the controller 140 may transmit state information of the preceding vehicle to a vehicle manufacturer server of the preceding vehicle in step S230.

Meanwhile, when it is determined that the preceding vehicle is not the autonomous in S220 (N), the controller 140 may determine a risk level of the preceding vehicle in step S240. When it is determined that the risk level of the preceding vehicle is a caution level in S240, the controller 140 may output a warning to a driver of a host vehicle in step S250.

After outputting the warning, in S260, the controller 140 may provide the driver with the right to select whether to operate avoidance logic for avoiding the preceding vehicle. In S270, the controller 140 may determine whether the operation of the avoidance logic for the preceding vehicle is selected by the driver. When it is determined that the operation of the avoidance logic for avoiding the preceding vehicle is not selected by the driver in S270 (N), the controller 140 may fail to perform the avoidance logic for the preceding vehicle in step S280. Meanwhile, when it is determined that the operation of the avoidance logic for avoiding the preceding vehicle is selected by the driver in S270 (Y), the controller 140 may perform the avoidance logic for the preceding vehicle in step S290.

Meanwhile, when the risk level of the preceding vehicle is a critical level in the S240 (N), the controller 140 may perform the avoidance logic for avoiding the preceding vehicle in step S290. In S290, the controller 140 may perform a control logic for resetting a route using the avoidance logic for the preceding vehicle, controlling to avoid the preceding vehicle within the lane, or changing a target inter-vehicle distance.

Figure 4:
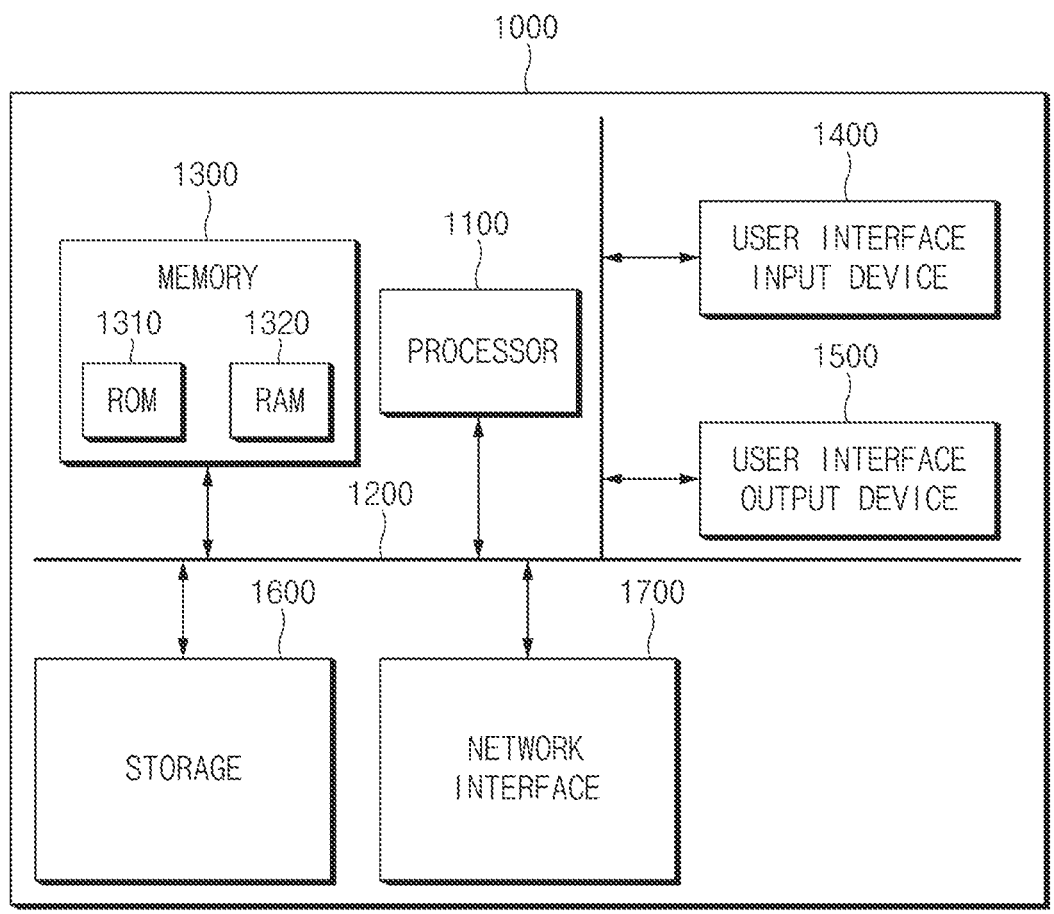
FIG. 4 is a block diagram illustrating a configuration of a computing system for executing the method according to an exemplary form of the present disclosure.

FIG. 4 is a block diagram illustrating a configuration of a computing system for executing the method according to another form of the present disclosure.

Referring to FIG. 4, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the forms disclosed herein may be embodied directly in hardware or a software module executed by the processor, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The driving controller for the vehicle and the method thereof according to an exemplary form of the present disclosure may be provided to provide corresponding logic capable of avoiding the preceding vehicle, when it is determined that a breakdown or risk occurs in the preceding vehicle, and transmit state information of the preceding vehicle to a server, when the preceding vehicle is an autonomous vehicle, thus efficiently managing the autonomous vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. A driving controller for a vehicle, the driving controller comprising:
   a detector configured to obtain driving information of a preceding vehicle and information about a road on which the vehicle and the preceding vehicle are traveling, wherein the driving information includes information for determining whether regulation is obeyed and information for determining behavior of the preceding vehicle; and
   a controller configured to
      determine a risk level of the preceding vehicle based on the driving information of the preceding vehicle, wherein the controller is configured to i) determine a driving state of the preceding vehicle based on regulations including autonomous driving regulations and a behavior state of the preceding vehicle and ii) determine the risk level based on the driving state of the preceding vehicle,
      determine whether to perform an avoidance control based on the risk level, and
      when i) the preceding vehicle is an autonomous vehicle and ii) the risk level is not normal level, transmit driving state information of the preceding vehicle to a server.

2. The driving controller of claim 1, wherein when the preceding vehicle is the autonomous vehicle, the controller is further configured to:
   select autonomous driving regulations and road traffic regulations included in the regulations, and
   determine the driving state of the preceding vehicle based on the autonomous driving regulations, the road traffic regulations, and the behavior state of the preceding vehicle.

3. The driving controller of claim 1, wherein when the preceding vehicle is not the autonomous vehicle, the controller is configured to:
   determine a driving state of the preceding vehicle based on road traffic regulations and a behavior state of the preceding vehicle, and
   determine the risk level based on the driving state of the preceding vehicle.

4. The driving controller of claim 1, wherein when the risk level of the preceding vehicle is a caution level, the controller is further configured to output a warning to a driver of the vehicle and guide the driver to select whether to perform the avoidance control.

5. The driving controller of claim 1, wherein when the risk level of the preceding vehicle is a critical level, the controller is further configured to perform the avoidance control.

6. The driving controller of claim 2, wherein when the preceding vehicle is the autonomous vehicle, the controller is further configured to determine the driving state of the preceding vehicle based on at least one of a time at which the preceding vehicle makes a lane change, a turn signal direction, a turn signal operation time, an emergency steering function operation, or whether a minimum risk maneuver (MRM) operates, which is included in the autonomous driving regulations.

7. The driving controller of claim 2, wherein when the preceding vehicle is the autonomous vehicle, the controller is further configured to determine the driving state of the preceding vehicle based on at least one of whether the preceding vehicle disobeys a traffic light, whether the preceding vehicle makes a lane change on a solid line area, whether the preceding vehicle does not obey a specified driving direction on a lane, or whether the preceding vehicle operates brake lights upon deceleration, which is included in the road traffic regulations.

8. The driving controller of claim 2, wherein when the preceding vehicle is the autonomous vehicle, the controller is further configured to determine the driving state of the preceding vehicle based on at least one of whether the preceding vehicle departs from a lane, whether the preceding vehicle performs a sudden deceleration or a sudden acceleration greater than a certain range, whether the preceding vehicle does not operate a turn signal upon a lane change, or whether the preceding vehicle makes lane changes above a certain number of times within a certain time, which is included in the behavior state.

9. A driving control method for a vehicle, the driving control method comprising:

obtaining, by a detector, driving information of a preceding vehicle, wherein the driving information includes information for determining whether regulation is obeyed and information for determining behavior of the preceding vehicle;

determining, by a controller, a risk level of the preceding vehicle based on the driving information of the preceding vehicle, including i) in response to determining, based on an indication received from the preceding vehicle, that the preceding vehicle is an autonomous vehicle, determining a driving state of the preceding vehicle based on regulations including autonomous driving regulations and a behavior state of the preceding vehicle and ii) determining the risk level based on the driving state of the preceding vehicle;

determining, by the controller, whether to perform an avoidance control based on the risk level; and when i) the preceding vehicle is an autonomous vehicle and ii) the risk level is not normal level, transmitting, by the controller, driving state information of the preceding vehicle to a server.

10. The driving control method of claim 9, further comprising:

when the preceding vehicle is the autonomous vehicle, selecting, by the controller, autonomous driving regulations and road traffic regulations included in the regulations, and determining, by the controller, the driving state of the preceding vehicle based on the autonomous driving regulations, the road traffic regulations, and the behavior state of the preceding vehicle.

11. The driving control method of claim 9, wherein determining the risk level of the preceding vehicle includes:

when the preceding vehicle is not the autonomous vehicle, determining, by the controller, a driving state of the preceding vehicle based on road traffic regulations and a behavior state of the preceding vehicle, and determining, by the controller, the risk level based on the driving state of the preceding vehicle.

12. The driving control method of claim 9, wherein determining whether to perform the avoidance control based on the risk level includes:

when the risk level of the preceding vehicle is a caution level, outputting a warning to a driver and guiding the driver to select whether to perform the avoidance control.

13. The driving control method of claim 9, wherein determining whether to perform the avoidance control based on the risk level includes:

when the risk level of the preceding vehicle is a critical level, performing the avoidance control.

14. The driving control method of claim 10, further comprising:

when the preceding vehicle is the autonomous vehicle, determining, by the controller, the driving state of the preceding vehicle based on at least one of a time at which the preceding vehicle makes a lane change, a turn signal direction, a turn signal operation time, an emergency steering function operation, or whether a minimum risk maneuver (MRM) operates, which is included in the autonomous driving regulations.

15. The driving control method of claim 10, further comprising:

when the preceding vehicle is the autonomous vehicle, determining, by the controller, the driving state of the preceding vehicle based on at least one of whether the preceding vehicle disobeys a traffic light, whether the preceding vehicle makes a lane change on a solid line area, whether the preceding vehicle does not obey a specified driving direction on a lane, or whether the preceding vehicle operates brake lights upon deceleration, which is included in the road traffic regulations.

16. The driving control method of claim 10, further comprising:

when the preceding vehicle is the autonomous vehicle, determining, by the controller, the driving state of the preceding vehicle based on at least one of whether the preceding vehicle departs from a lane, whether the preceding vehicle performs a sudden deceleration or a sudden acceleration greater than a certain range, whether the preceding vehicle does not operate a turn signal upon a lane change, or whether the preceding vehicle makes lane changes above a certain number of times within a certain time, which is included in the behavior state.

* * * * *